(12) United States Patent
Tijare et al.

(10) Patent No.: US 6,950,815 B2
(45) Date of Patent: Sep. 27, 2005

(54) CONTENT MANAGEMENT SYSTEM AND METHODOLOGY FEATURING QUERY CONVERSION CAPABILITY FOR EFFICIENT SEARCHING

(75) Inventors: Parag V. Tijare, San Jose, CA (US); Hui-I Hsiao, Saratoga, CA (US); Randy Richardt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 10/128,306

(22) Filed: Apr. 23, 2002

(65) Prior Publication Data

US 2003/0200218 A1 Oct. 23, 2003

(51) Int. Cl.[7] .......................... G06F 17/30; G06F 17/00
(52) U.S. Cl. ........................... 707/1; 707/100; 707/102; 707/200
(58) Field of Search .................. 707/1–4, 10, 100, 707/102, 104.1, 200

(56) References Cited

U.S. PATENT DOCUMENTS

| | | |
|---|---|---|
| 4,751,740 A | 6/1988 | Wright |
| 4,969,091 A | 11/1990 | Muller |
| 5,615,337 A | 3/1997 | Zimowski et al. |
| 5,644,768 A | 7/1997 | Periwal et al. |
| 5,742,810 A | 4/1998 | Ng et al. |
| 5,774,719 A | 6/1998 | Bowen |
| 5,778,398 A | 7/1998 | Nagashima et al. |
| 5,799,310 A | 8/1998 | Anderson et al. |
| 5,819,252 A | 10/1998 | Benson et al. |
| 5,862,378 A | 1/1999 | Wang et al. |
| 5,875,332 A | 2/1999 | Wang et al. |
| 5,892,902 A | 4/1999 | Clark |
| 5,940,616 A | 8/1999 | Wang |
| 6,012,067 A | 1/2000 | Sarkar |
| 6,016,394 A | 1/2000 | Walker |
| 6,047,291 A | 4/2000 | Anderson et al. |

(Continued)

OTHER PUBLICATIONS

Jeonghee Kim, Taissok Han, and Suk Kyoon Lee, "Visualization of Path Expressions in a Visual Object–Oriented Database Query Language," (2 pages).

Chien–I Lee, Ye–In Chang, and Wei–Pang Yang, "Design Of A New Indexing Organization For A Class–Aggregation Hierarchy in Object–Oriented Databases", Journal of Information Science and Engineering 15, 1999, pp. 217–241, Taiwan.

Jörn W. Janneck and Martin Naedele, "Modeling Hierarchical and Recursive Structures Using Parametric Petri Nets." Computer Engineering and Networks Laboratory, Swiss Federal Institute of Technology Zurich, pp. 445–452.

Akira Kawaguchi, Daniel Lieuwen, Inderpal Mumick, Kenneth Ross, "Implementing Incremental View Maintenance in Nested Data Models" Database Programming Languages, 6th International Workshop, D8PL–6, Aug. 18–20, 1997 Proceedings, pp. 203–221.

Li Tian–Zhu, "Normalization of Nested Structure for Complex Objects" in Chinese, Journal of Software, vol. 9, No. 5, p. 390–396, May 1998, (with English Abstract).

*Primary Examiner*—Alford W. Kindred
(74) *Attorney, Agent, or Firm*—Hovey Williams LLP

(57) ABSTRACT

A content management system is provided including a library server in which user and system metadata is stored in a plurality of tables forming a tree-based storage hierarchy. The metadata is stored in a first data format compatible with a complex query language such as Structured Query Language (SQL). A query processor in the library server maps the first data format to a second data format which is compatible with a simpler query language such as XML query language. A client's user experience is substantially simplified when queries are presented to the system.

21 Claims, 5 Drawing Sheets

U.S. PATENT DOCUMENTS

| | | |
|---|---|---|
| 6,055,637 A | 4/2000 | Hudson et al. |
| 6,063,133 A | 5/2000 | Li et al. |
| 6,065,117 A | 5/2000 | White |
| 6,067,414 A | 5/2000 | Wang et al. |
| 6,088,524 A | 7/2000 | Levy et al. |
| 6,104,393 A | 8/2000 | Santos-Gomez |
| 6,128,621 A | 10/2000 | Weisz |
| 6,148,342 A | 11/2000 | Ho |
| 6,161,182 A | 12/2000 | Nadooshan |
| 6,167,405 A | 12/2000 | Rosensteel, Jr. et al. |
| 6,173,400 B1 | 1/2001 | Perlman et al. |
| 6,219,826 B1 | 4/2001 | De Pauw et al. |
| 6,233,586 B1 | 5/2001 | Chang et al. |
| 6,263,313 B1 | 7/2001 | Milsted et al. |
| 6,263,342 B1 | 7/2001 | Chang et al. |
| 6,272,488 B1 | 8/2001 | Chang et al. |
| 6,279,111 B1 | 8/2001 | Jensenworth et al. |
| 6,282,649 B1 | 8/2001 | Lambert et al. |
| 6,289,344 B1 | 9/2001 | Braia et al. |
| 6,289,458 B1 | 9/2001 | Garg et al. |
| 6,292,936 B1 | 9/2001 | Wang |
| 6,308,274 B1 | 10/2001 | Swift |
| 6,314,449 B1 | 11/2001 | Gallagher et al. |
| 6,327,629 B1 | 12/2001 | Wang et al. |
| 6,338,056 B1 | 1/2002 | Dessloch et al. |
| 6,339,777 B1 | 1/2002 | Attaluri et al. |
| 6,343,286 B1 | 1/2002 | Lee et al. |
| 6,591,272 B1 * | 7/2003 | Williams .................... 707/102 |
| 2001/0002486 A1 | 5/2001 | Kocher et al. |
| 2001/0008015 A1 | 7/2001 | Vu et al. |
| 2001/0019614 A1 | 9/2001 | Madoukh |
| 2003/0018607 A1 * | 1/2003 | Lennon et al. ................. 707/1 |

* cited by examiner

Item Type

FIG. 5

| ITEM TYPE: | ATTRIBUTES: |
|---|---|
| Conference | (Title, Frequency) |

FIG. 6

| ITEM TYPE: | ATTRIBUTES: |
|---|---|
| SIG | (Title, Region) |

CONTENT MANAGEMENT SYSTEM AND METHODOLOGY FEATURING QUERY CONVERSION CAPABILITY FOR EFFICIENT SEARCHING

FIELD OF THE INVENTION

The disclosures herein relate generally to databases and more particularly to methods and apparatus for storing and accessing information in content management systems.

BACKGROUND

Conventional content management systems, such as that shown in FIG. 1A, typically include a Library Server (LS), one or more Resource Managers (RMs) and a client access application program interface (API). A client is coupled by a network to the API and seeks information stored in the Resource Manager. The Library Server stores metadata relating to all objects or data stored in the Resource Manager. The Library Server also controls the particular objects that a particular client user can access. Client users can submit requests known as queries through the API to search or retrieve metadata stored in the Library Server or objects stored in the Resource Manager.

One approach employed to store items in a content management system is to model an item in a single table. Unfortunately, such a single table approach results in many fields among the rows and columns of the table being unused. Such an approach is inefficient from the storage viewpoint. In the past, flat data models have been used to store data in a content management system. For example, FIG. 1B shows an Item Type which is represented by a single table to form such a flat data storage model.

Content management systems typically store three types of information, namely primary content (data), user metadata and system metadata. Primary content is stored in the Resource Manager and includes both structured and semi-structured data such as text files, images, web pages, video clips, for example. Descriptions of, and information about the primary content stored in the Resource Manager, which are normally provided by client users, are referred to as "user metadata" which is stored in the Library Server. In contrast to "user metadata", "system metadata" is the information created by the content management system itself for access control, storage management, and content tracking and reference. Both user metadata and system metadata reside in the Library Server which acts as a repository for the metadata in database form. As compared to primary content, both user and system metadata are well structured. In general, content management systems provide a set of functions for content (data and metadata) creation, content search and retrieval, and content distribution that enable user to manage data, system metadata and user metadata. As mentioned, one approach depicted in FIG. 1A is to store the metadata in the Library Server and to store the primary content (data) in a separate component designated the Resource Manager. Another approach is to store both metadata and primary content in a common database.

In most content management systems, both system metadata and user metadata are searchable. However, content-based searching of the primary content is more limited. Traditionally, search on the metadata, termed parametric search, is through either a specific API or via SQL language on many systems. Since content management systems in general provide a much richer data model than their underlying database systems, writing search queries based on a specific API or SQL can be both tedious and inefficient.

What is needed is a methodology and apparatus for providing the content management system user with a simplified user experience when preparing queries to search for specific data stored in the system.

SUMMARY

The disclosure herein involves a content management system which employs a hierarchical item type tree-based structure including tables at different levels to store metadata for items. More particularly, a method of organizing information in a content management system is disclosed which includes the steps of storing metadata in a tree hierarchy of tables in a storage repository using a first data format. The method also includes accessing the metadata in the storage repository to provide accessed metadata. The method further includes creating a view of the accessed metadata in a second data format. The method also includes the step of running a query against the view of the accessed metadata in the second data format.

A principal advantage of the embodiment disclosed herein is a significantly simplified user experience when running queries in the content management system.

BRIEF DESCRIPTION OF THE DRAWINGS

FIG. 5 is a table representing the item type, Conference and having attributes Title and Frequency.

FIG. 6 is a table representing SIG (Special Interest Group) and having attributes Title and Region.

DETAILED DESCRIPTION

Figure 1A:
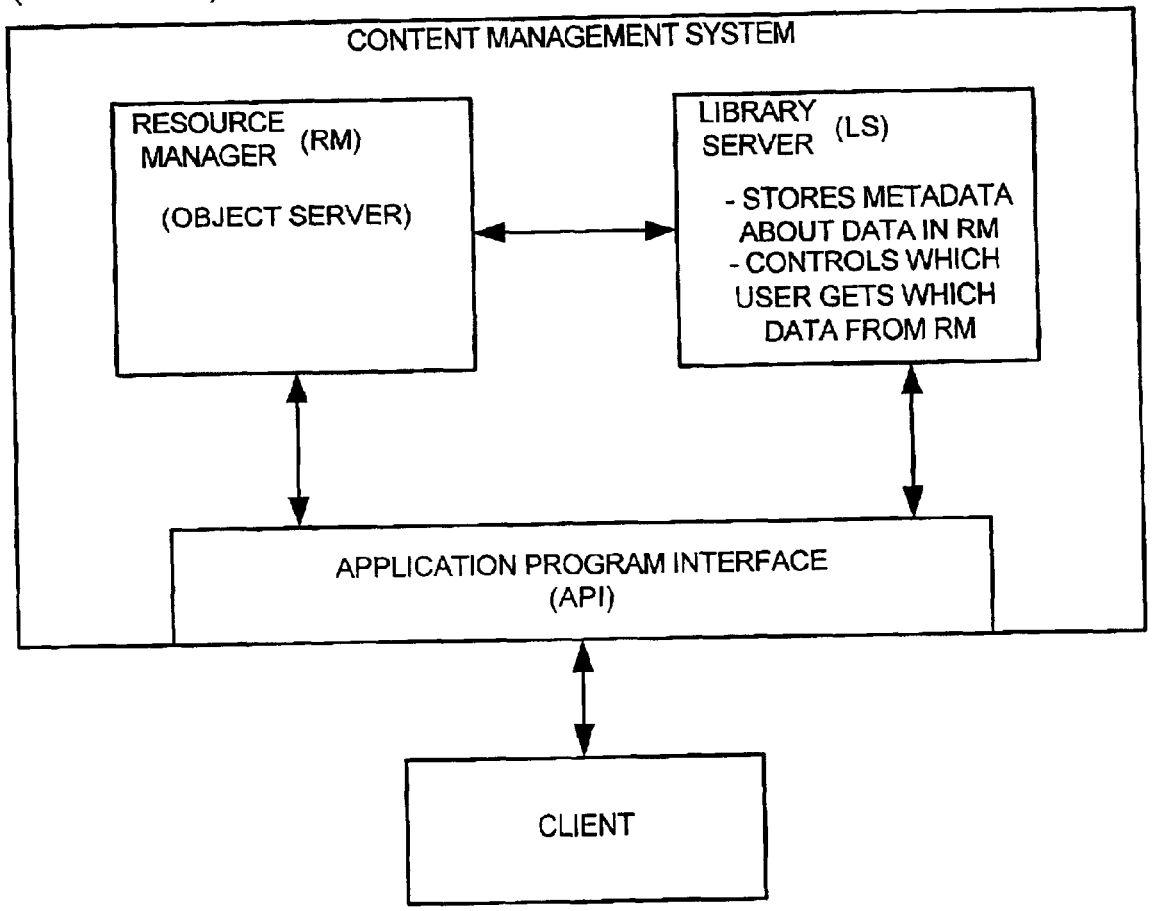
FIG. 1A is a high level block diagram of a conventional content management system showing both server and client.
Figure 1B:
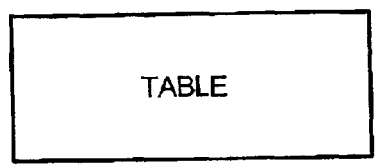
FIG. 1B is a representation of a flat storage data model showing a single storage table.
Figure 2:
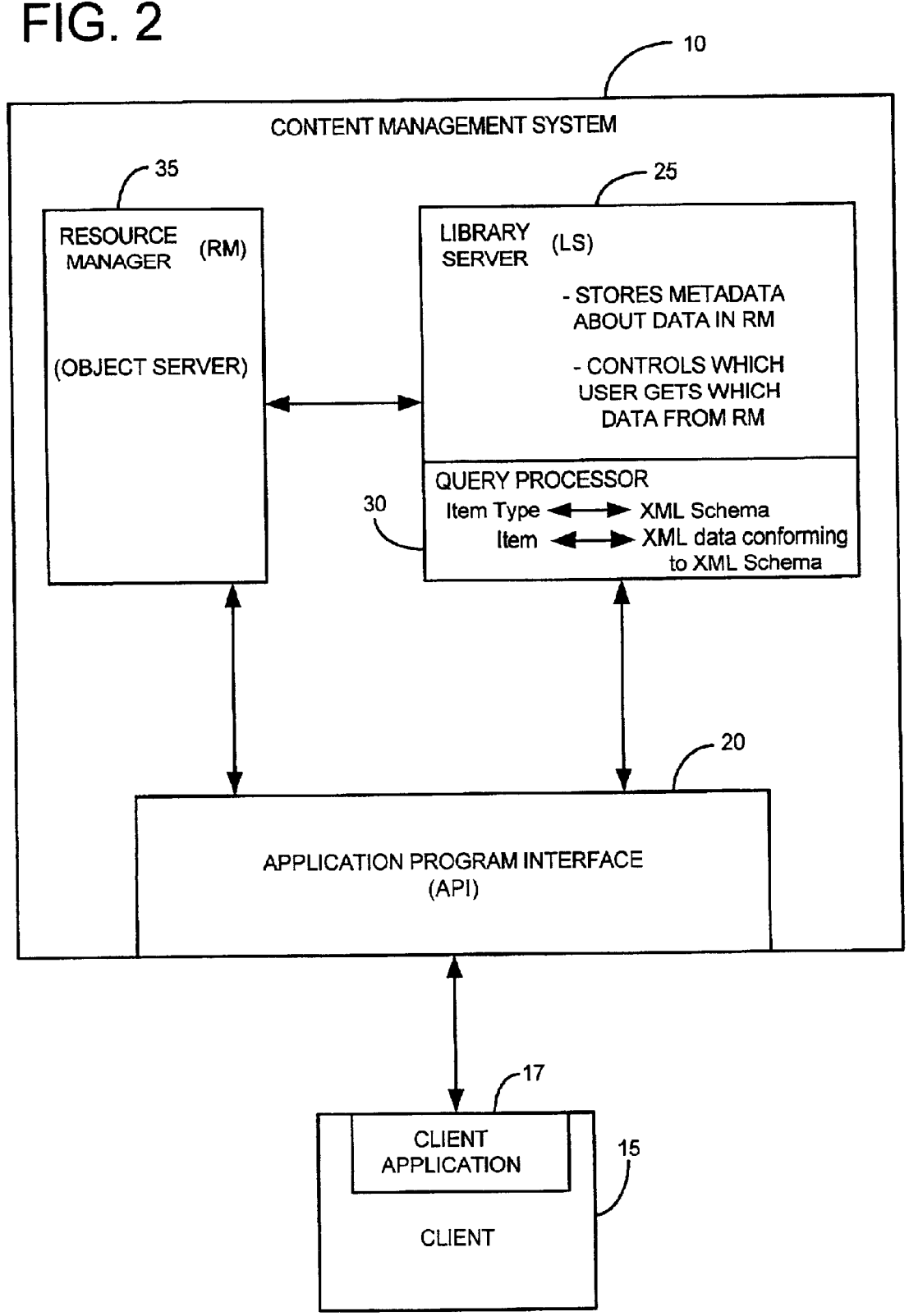
FIG. 2 is a block diagram of one embodiment of the disclosed content management system.

FIG. 2 is a block diagram of one embodiment of content management system 10. A client computer 15 including a client application 17 is coupled to content management system 10 via the system's application program interface (API) 20. A library server (LS) 25 is coupled to API 20 and receives queries from client application 17 in client 15. These queries seek information which is stored in library server 25 and/or resource manager 35. Library server 25 includes a query processor 30 which receives queries in a first format from client 15 and translates the queries into a second format usable by library server 25 as will be described later in more detail.

Library server 25 is coupled to resource manager 35 and contains user and system metadata concerning the primary content (data or objects) that are stored in resource manager 35. Many types of data can be stored in resource manager 35, for example, business information, applications, text, audio, video and streaming data, just to name a few.

Content management system 10 employs a rich data model wherein data including metadata is stored in a tree-based hierarchical data structure including multiple database tables. In this model, an item is the basic unit of resource managed by the system. More specifically, an item is a typed object whose type is defined by an Item Type. Logically, an Item Type is composed of components arranged in a hierarchy. This hierarchy forms a tree structure and has a unique root component. An Item is an instance of an Item Type. It is composed of one instance of the root component and zero or more instances of descendant components, also called child components (repeating groups). Within the Item, these component instances have ancestor-descendant relationships as dictated by the Item Type. In implementation, an Item Type is composed of multiple relational or object-relational database tables, each representing a component of the Item Type. An Item is composed of one row from the database table representing the root component and zero or more rows from each of the database tables representing descendant components (child components)

A query with predicates involving attributes from multiple components of an Item Type, if written in SQL, would require specifying "joins" which reflect the ancestor-descendant relationships between those components. It was discovered that it is possible to hide this complexity from users/applications, if the system can provide higher level query language that automatically maps the client application data model of client 15 to the underlying (relational or object relational) database data model employed by library server 25.

It was mentioned earlier that traditionally, search on the metadata is through either a specific API or via SQL language on some systems. Since content management systems in general provide a much richer data model than their underlying database systems, writing search queries based on a specific API or SQL can be both tedious and inefficient in content management systems without query processor 30. This is so because an "item" can be a compound object, which maps into multiple database tables. To search on properties of an item, users would potentially need to either write very complex SQL query involving many complex join and/or union operations or make many complex API calls. For some queries searching on user metadata, it is first necessary to query the system metadata, thus requiring multiple SQL statements. (Note: e.g. to find all publications with a specific Title, it is first necessary to find which Item Types contain attribute Title). The disclosed content management system 10 with its query processor 30 advantageously insulates the client user from these high levels of query complexity.

Content management system 10 includes a hierarchical data structure, repeating groups, link relationships and reference attributes. One goal of content management system 10 is to abstract out the application data model and provide a high level query language for which it is both easy for client users to write queries and yet which can be efficiently executed by the system.

An example of a content management system 10 data model including 4 representative Item Types and demonstrating query conversion is now presented. FIGS. 3, 4, 5 and 6 show the following Item Types respectively: Journal, Book, Conference, and SIG (Special Interest Group).

Figure 3:
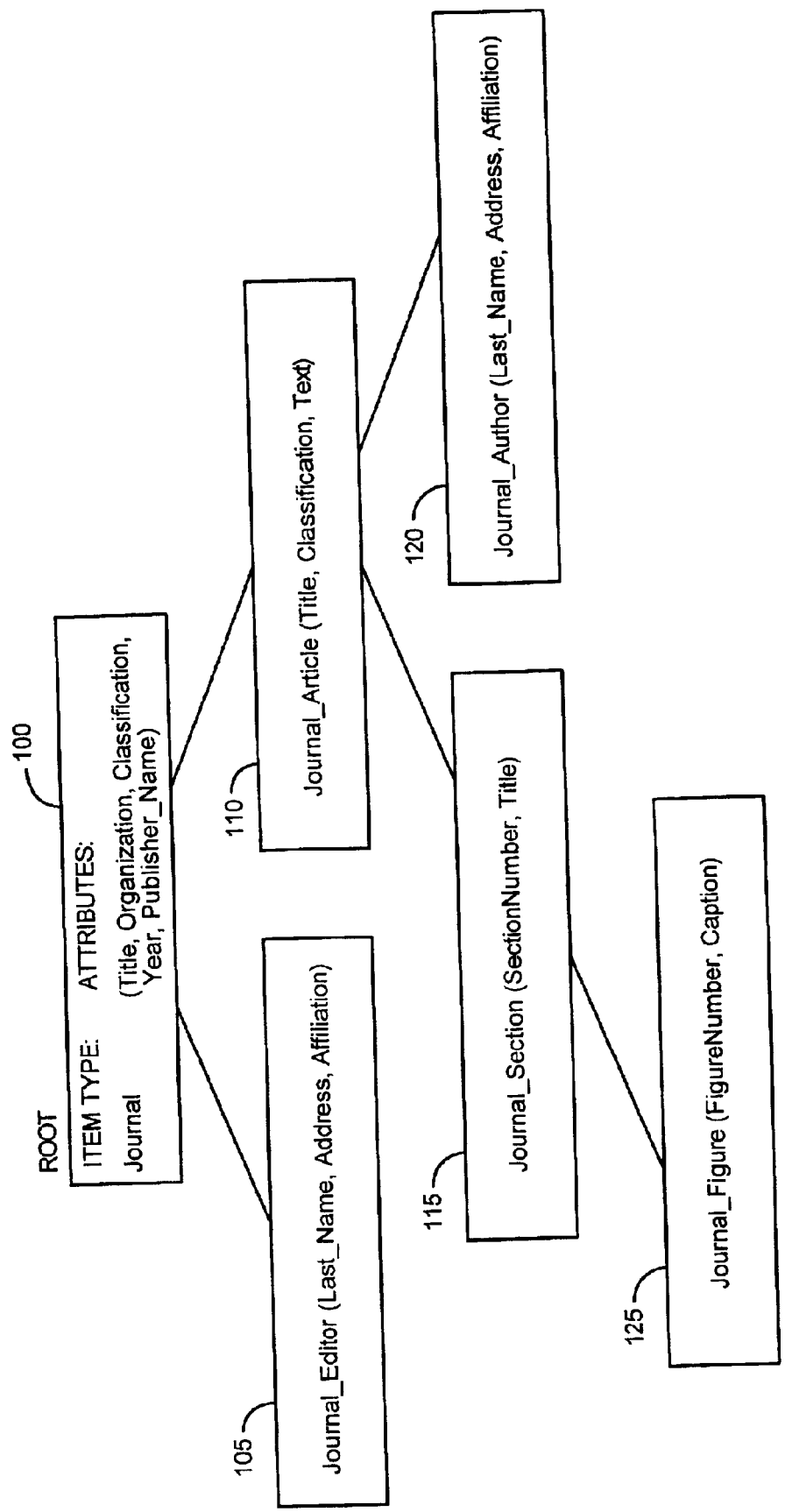
FIG. 3 shows the tree-based hierarchy of an Item Type, Journal, which is formed from multiple related tables.

FIG. 3 shows the tree-based hierarchy of an Item Type, Journal, (designated 100) which is formed from multiple related tables. Journal is the root component and includes the following attributes: Title, Organization, Classification, Year, Publisher_Name. The child components Journal_Editor 105 and Journal_Article 110 relate back to root component or parent Journal 100. The Journal_Editor child component 105 includes the following attributes: Last_Name, Address, Affiliation. The Journal_Article child component 110 includes the following attributes: Title, Classification and Text. Child components Journal_Section 115 and Journal_Author 120 relate back to parent component Journal_Article 110. Child component Journal_Section 115 includes the following attributes: Section Number and Title. Child component Journal_Author 120 includes the following attributes: Last_Name, Address and Affiliation. The tree hierarchy also includes another child component Journal_FIG. 125 which relates back to parent component 115 as shown and includes the following attributes: FigureNumber and Caption. It is noted that Journal_Article.Text is an attribute which represents the text of an article or a pointer to the text of the article.

Figure 4:
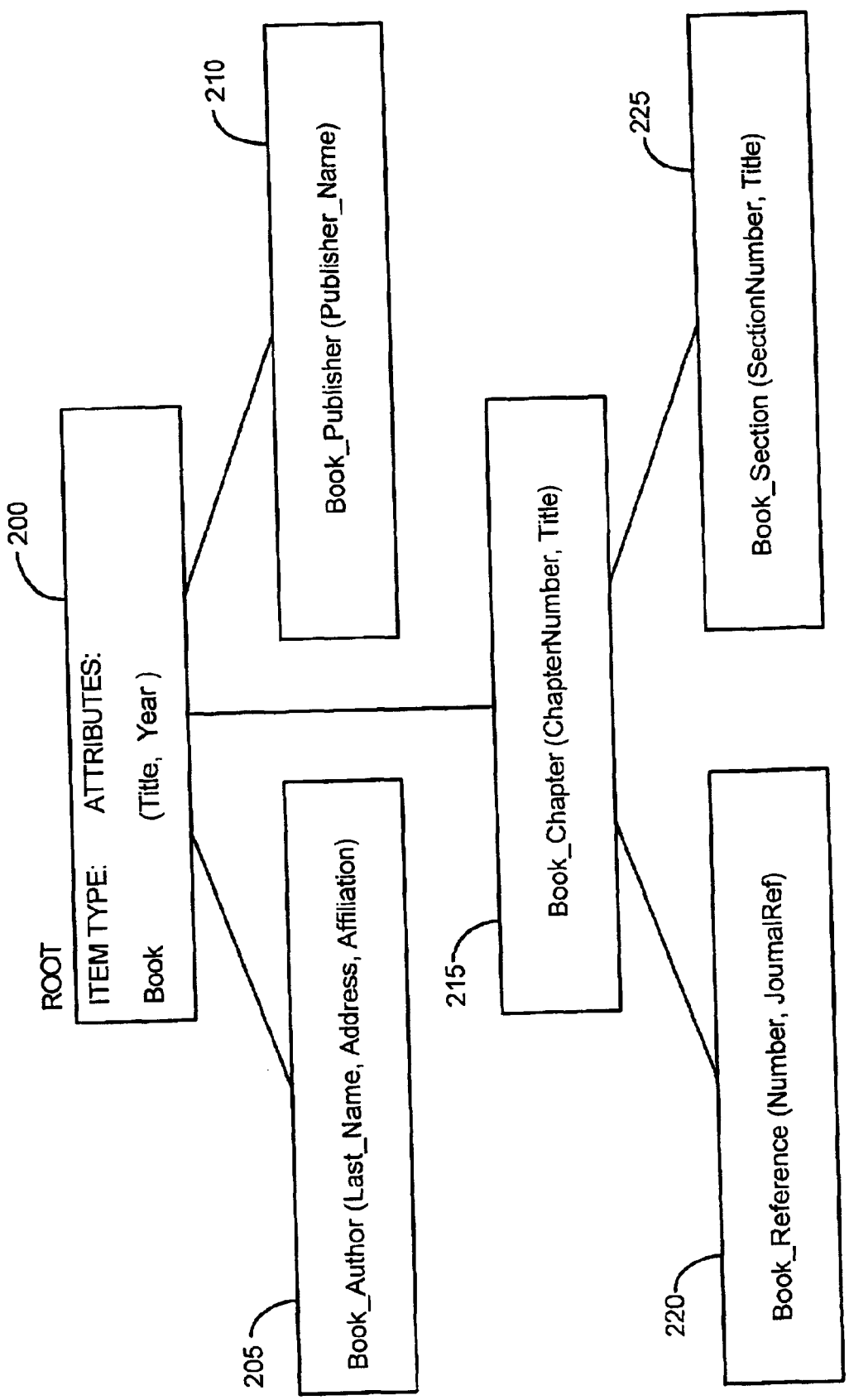
FIG. 4 shows the tree-based hierarchy of an Item Type, Book, which is formed from multiple related tables.

FIG. 4 shows the tree-based hierarchy of an Item Type, Book, (designated 200) which is formed from multiple related tables. Book is the root component and includes the following attributes: Title and Year. The child components Book_Author 205 and Book_Publisher 210 relate back to root component or parent Book 200. The Book_Author child component 205 includes the following attributes: Last_Name, Address, Affiliation. The Book_Publisher child component 210 includes the following attribute: Publisher_Name. This tree hierarchy also includes child component Book_Chapter 215 which includes the following attributes: ChapterNumber and Title. Dependent from Book_Chapter child table 215 are the Book_Reference child component 220 and the Book_Section child component 225. Book_Reference child component 220 includes the following attributes: Number and JournalRef. Book_Section child component 225 includes the following attributes: SectionNumber and Title. It is noted that Book_Reference contains references to journals from a chapter of a book. The attribute JournalRef is a reference attribute.

FIG. 5 is a table representing the item type, Conference and having attributes Title and Frequency. FIG. 6 is a table representing SIG (Special Interest Group) and having attributes Title and Region. The item SIG serves as a container for conferences, journals, etc.

To simplify the query process as earlier described, the tree-based content manager hierarchies shown in FIGS. 3, 4, 5 and 6 are first mapped from the content manager (e.g. SQL) format to another format, such as an XML format, for example. The content manager system metadata, namely both system and user metadata are viewed as a single hierarchically structured document, such as an XML document, for example. Using an XML document as an example, the elements of the content management system data model are viewed is follows: 1) The component hierarchy is represented by nesting of XML elements; 2) Repeating groups are represented by a sequence of XML elements, and 3) A link is represented as IDREF attributes nested within both the element representing the source Item and the element representing the target Item of the link.

To achieve the above described mapping, each content management system Item in represented by nested XML elements, with the top level XML element representing the root component and the nested XML elements representing the descendant components. The nesting of the XML element thus represents the component hierarchy.

Five mapping rules are now described which assist in the conversion of an XML query to an SQL query, effectively by mapping the SQL data model format to the XML data model format such that XQuery, the query language of XML will run on content management (CM) system 10. A way has been discovered to view the tree-based SQL hierarchy of the content management (CM) system as an XML document, such that queries written in Xquery format can be run against it. Query processor 30 of library server 25 implements the five following mapping rules.

Mapping Rule 1—CM Root Components

The CM root component of an Item is represented by a top level XML element with XML attributes: String ItemID, String VersionID, ID ItemVersionID plus all the user defined attributes within that component. ItemVersionID can be thought of as concatenation of ItemID and VersionID, thus making it unique within library server 25.

Mapping Rule 2—CM Child Components

Each CM child component of the Item is represented by a nested XML element with attributes same as the user defined attributes of the CM child component.

Mapping Rule 3—CM User-defined Attributes

Each user-defined CM attribute is represented as an XML attribute within the XML element representing the containing CM component.

Mapping Rule 4—CM Links

Although the inbound and outbound links are not a part of an Item itself in the CM data model (i.e. they are stored separately in the Links table), for the purpose of querying it is very convenient to conceptually think of them as being a part of the XML element representing the Item. This relieves applications from writing joins explicitly in the queries. The links originating at an Item are represented by <Outbound_Link> XML elements with attributes: IDREF LinkItemRef, IDREF TargetItemRef and INTEGER LinkType. The LinkItemRef is a reference to the Item associated with the link. The TargetItemRef is a reference to the Item pointed to by the link. The LinkType is the type of the link. Similarly links pointing to an Item are represented by <Inbound_Link> XML elements with attributes: IDREF LinkItemRef, IDREF SourceItemRef and INTEGER LinkType. The SourceItemRef is a reference to the Item where the link originates. In the CM data model, links are independent of versions. i.e. a link between two items is essentially a link between all versions of both items. Thus if items I1 and I2 are the source and destination respectively of a link, the conceptual XML representation of I1 will have nested within it, an <Outbound_Link> element for each version of I2 that exists in the LS. Similarly, the representation of I2 will have nested within it, an <Inbound_Link> element for each version of I1 that exists in the LS.

Mapping Rule 5—CM Reference Attributes

A CM reference attribute is represented by an IDREF XML attribute within the XML element representing component containing the attribute. In the CM data model, references are version specific. i.e. a reference attribute points to a specific version of an Item.

The CM data model set forth in the representations of Item Type Journal in FIG. 3, Item Type Book in FIG. 4, Item Type Conference in FIG. 5 and Item Type SIG in FIG. 6 can be viewed as an XML document "LS.xml" with the following schema by applying the above described mapping rules thereto.

Applying the above mapping rules results in the following representative XML schema:

```
<xsd:schema xmlns:xsd="http://www.w3.org/2001/XMLSchema">
    <xsd:element name="Journal" type ="JournalType" />
    <xsd:complexType name="JournalType">
        <xsd:sequence>
            <xsd:element name="Journal_Editor" type ="EditorType" minOccurs="0"
                maxOccurs="unbounded"/>
            <xsd:element name="Journal_Article" type ="ArticleType" minOccurs="0"
                maxOccurs="unbounded" />
            <xsd:element name="Outbound_Link" type ="OutLinkType" minOccurs="0"
                maxOccurs="unbounded" />
            <xsd:element name="Inbound_Link" type ="InLinkType" minOccurs="0"
                maxOccurs="unbounded" />
        </xsd:sequence>
        <xsd:attribute name="ItemID" type="xsd:String" />
        <xsd:attribute name="VersionID" type="xsd:String" />
        <xsd:attribute name="ItemVersionID" type="xsd:ID" />
        <xsd:attribute name="Title" type="xsd:string" />
        <xsd:attribute name="Organization" type="xsd:string" />
        <xsd:attribute name="Classification" type="xsd:string" />
        <xsd:attribute name="Year" type="xsd:string" />
        <xsd:attribute name="Publisher_Name" type="xsd:string" />
    </xsd:complexType>
    <xsd:complexType name="EditorType">
        <xsd:attribute name="Last_Name" type ="xsd:string"/>
        <xsd:attribute name="Address" type ="xsd:string" />
            <xsd:attribute name="Affiliation" type ="xsd:string" />
    </xsd:complexType>
    <xsd:complexType name="ArticleType">
        <xsd:sequence>
            <xsd:element name="Journal_Author" type ="AuthorType" minOccurs="0"
                maxOccurs="unbounded"/>
            <xsd:element name="Journal_Section" type ="SectionType" minOccurs="0"
                maxOccurs="unbounded" />
        </xsd:sequence>
        <xsd:attribute name="Title" type="xsd:string" />
        <xsd:attribute name="Classification" type="xsd:string" />
        <xsd:attribute name="Text" type="xsd:string" />
    </xsd:complexType>
    <xsd:complexType name="SectionType">
        <xsd:element name="Journal_Figure" type ="FigureType" minOccurs"0"
                maxOccurs="unbounded"/>
        <xsd:attribute name="SectionNumber" type="xsd:string" />
```

-continued

```
            <xsd:attribute name="Title" type="xsd:string" />
        </xsd:complexType>
        <xsd:complexType name="FigureType">
            <xsd:attribute name="FigureNumber" type="xsd:string" />
            <xsd:attribute name="Caption" type="xsd:string" />
        </xsd:complexType>
        <xsd:element name="Book" type ="BookType" />
        <xsd:complexType name="BookType">
            <xsd:sequence>
                <xsd:element name="Book_Publisher" type ="PublisherType" minOccurs="0"
                        macOccurs="unbounded"/>
                <xsd:element name="Book_Author" type ="AuthorType" minOccurs="0"
                        maxOccurs="unbounded"/>
                <xsd:element name="Book_Chapter" type ="ChapterType" minOccurs="0"
                        maxOccurs="unbounded" />
                <xsd:element name="Outbound_Link" type ="OutLinkType" minOccurs="0"
                        maxOccurs="unbounded" />
                <xsd:element name=Inbound_Link" type ="InLinkType" minOccurs="0"
                        maxOccurs="unbounded" />
            </xsd:sequence>
            <xsd:attribute name="ItemID" type="xsd:String" />
            <xsd:attribute name="VersionID" type="xsd:String" />
            <xsd:attribute name="ItemVersionID" type="xsd:ID" />
            <xsd:attribute name="Title" type="xsd:string" />
            <xsd:attribute name="Year" type="xsd:string" />
</xsd:complexType>
<xsd:complexType name="PublisherType">
    <xsd:attribute name="Publisher_Name" type ="xsd:string"/>
</xsd:complexType>
<xsd:complexType name="AuthorType">
    <xsd:attribute name="Last_Name" type="xsd:string" />
    <xsd:attribute name="Address" type="xsd:string" />
    <xsd:attribute name="Affiliation" type="xsd:string" />
</xsd:complexType>
<xsd:complexType name="ChapterType">
    <xsd:element name="Book_Section" type ="SectionType" minOccurs="0"
            maxOccurs="unbounded"/>
    <xsd:element name="Book_Reference" type ="RefType" minOccurs="0"
            maxOccurs="unbounded"/>
    <xsd:attribute name="ChapterNumber" type="xsd:string" />
    <xsd:attribute name="Title" type="xsd:string" />
</xsd:complexType>
        <xsd:complexType name="SectionType">
            <xsd:attribute name="SectionNumber" type="xsd:string" />
            <xsd:attribute name="Title" type="xsd:string" />
        </xsd:complexType>
        <xsd:complexType name="RefType">
            <xsd:attribute name="Number" type="xsd:string" />
            <xsd:attribute name="JournalRef" type="xsd:IDREF" />
        </xsd:complexType>
        <xsd:element name="Conference" type ="ConfType" />
        <xsd:complexType name="ConfType">
            <xsd:sequence>
                <xsd:element name="Outbound_Link" type ="OutLinkType" minOccurs="0"
                        maxOccurs="unbounded" />
                <xsd:element name="Inbound_Link" type ="InLinkType" minOccurs="0"
                        maxOccurs="unbounded" />
            </xsd:sequence>
            <xsd:attribute name="ItemID" type="xsd:String" />
            <xsd:attribute name="VersionID" type="xsd:String" />
            <xsd:attribute name="ItemVersionID" type="xsd:ID" />
            <xsd:attribute name="Title" type="xsd:string" />
            <xsd:attribute name="Frequency" type="xsd:string" />
        </xsd:complexType>
<xsd:element name="SIG" type ="SIGType" />
    <xsd:complexType name="SIGType">
        <xsd:sequence>
            <xsd:element name="Outbound_Link" type ="OutLinkType" minOccurs="0"
                    maxOccurs="unbounded" />
            <xsd:element name="Inbound_Link" type ="InLinkType" minOccurs="0"
                    maxOccurs="unbounded" />
        </xsd:sequence>
        <xsd:attribute name="ItemID" type="xsd:String" />
        <xsd:attribute name="VersionID" type="xsd:String" />
        <xsd:attribute name="ItemVersionID" type="xsd:ID" />
        <xsd:attribute name="Title" type="xsd:string" />
        <xsd:attribute name="Region" type="xsd:string" />
    </xsd:complexType>
    <xsd:complexType name="OutLinkType">
```

-continued

```
        <xsd:attribute name="LinkItemRef" type="xsd:IDREF" />
        <xsd:attribute name="TargetItemRef" type="xsd:IDREF" />
        <xsd:attribute name="LinkType" type="xsd:string" />
    </xsd:complexType>
    <xsd:complexType name="InLinkType">
        <xsd:attribute name="LinkItemRef" type="xsd:IDREF" />
        <xsd:attribute name="SourceItemRef" type="xsd:IDREF" />
        <xsd:attribute name="LinkType" type="xsd:string" />
    </xsd:complexType>
</xsd:schema>
```

The following 5 query examples show representative XML syntax queries followed by a corresponding SQL query defined under the CM data model. These comparisons demonstrate the very significant simplification provided to the user once the mapping is applied to the hierarchical CM data model. After mapping, the client user can use a simple first format query language such as Xquery resulting in a significantly improved user experience as compared to the client user using SQL query directly on the CM hierarchical data model.

EXAMPLE QUERY #1

Find all journal articles by author "Hsiao" which contain figures with the caption "Architecture".

```
XML Query syntax: //Journal_Article[Journal_Author/@Last_Name = "Hsiao"
                    AND .//Journal_Figure/@Caption = "Architecture"]
SQL query:
SELECT DISTINCT Journal_Article.ItemID, Journal_Article.ComponentID,
        Journal_Article.VersionID
FROM Journal_Article, Journal_Author, Journal_Section, Journal_Figure
WHERE Journal_Article.ComponentID = Journal_Author.ParentCompID
    AND Last_Name = "Hsiao"
    AND Journal_Article.ComponentID = Journal_Section.ParentCompID
    AND Journal_Section.ComponentID = Journal_Figure.ParentCompID
    AND Journal_Figure.Caption = 'Architecture'
```

Clearly, the XML Query syntax is much simpler for the client user than SQL query. The document ("LS.xml") is the implicit context node for all queries and is determined by the context of connection to the Library Server (LS) 25. The predicate Journal_Author/@Last_Name="Hsiao" evaluates to true if "Hsiao" is equal to any element of the set Journal_Author/@Last_Name. Thus it evaluates to true for all journal articles which contain one or more articles written by "Hsiao". The Journal_Section table needs to be joined in as well to specify the ancestor-descendent relationship between articles and figures.

EXAMPLE QUERY #2

Find all publications by 'Morgan-Kaufman' in year 2000. Find only those which are latest versions.

```
XML Query syntax: /*[@Year = "2000" AND .//@Publisher_Name = "Morgan-Kaufman"
AND @VersionID = latest-version(.)]
SQL Query:
SELECT DISTINCT Journal.ItemID, Journal.ComponentID, Journal.VersionID
FROM Journal, ICMSTITEMSnnnsss
WHERE Year = 2000 AND Publisher_Name = 'Morgan-Kaufman'
    AND ICMSTITEMSnnnsss.ItemID = Journal.ItemID
    AND ICMSTITEMSnnnsss.VersionID = Journal.VersionID
UNION
SELECT DISTINCT Book.ItemID, Book.ComponentID, Book.VersionID
FROM Book, Book_Publisher, ICMSTITEMSnnnsss
WHERE Book.ComponentID = Book_Publisher.ParentCompID
    AND Year = 2000 AND Publisher_Name = 'Morgan-Kaufman'
    AND ICMSTITEMSnnnsss.ItemID = Book.ItemID
    AND ICMSTITEMSnnnsss.VersionID = Book.VersionID
```

The query subexpression "/*" selects all root components. The predicate involves attributes @Year and @Publisher_Name. These are present only in Journal and Book Item Types. So the result can only contain these Item Types. This example shows how both metadata and data search can be expressed in a single XML Query. Since only latest versions are desired in this query, a function latest-version( ) is used which returns the VersionID of the latest version of XML elements representing Items. (Note: The system table ICM-STITEMSnnnsss contains only the latest versions of all Items of all Item Types. The Item Type specific tables (e.g. Book, Journal) contain all versions of Items of those specific Item Types).

EXAMPLE QUERY #3

Find all journals which have links from Special Interest Groups (SIGs) with title 'SIGMOD'.

```
XML Query syntax: /SIG[@Title = "SIGMOD"]/Outbound_Link/@TargetItemRef=> Journal
SQL Query:
SELECT DISTINCT Journal.ItemID, Journal.ComponentID, Journal.VersionID
FROM SIG, ICMSTLINKS001001, Journal
WHERE SIG.Title = 'SIGMOD'
    AND SIG.ItemID = ICMSTLINKS001001.SourceItemID
    AND ICMSTLINKS001001.TargetItemID = Journal.ItemID
```

The subexpression /SIG[@Title="SIGMOD"]/Outbound_Link selects the Outbound_Link elements for SIGs with title 'SIGMOD'. The subexpression @TargetItemRef=> Journal dereferences the @TargetItemRef attributes of these elements to select the corresponding journals.

EXAMPLE QUERY #4

Find all journal articles which contain the text 'The authors are thankful to'.

```
XML Query syntax: //Journal_Article[contains-text(@Text, "'The authors are thankful to'")=1]
SQL Query:
SELECT DISTINCT Journal_Article.ItemID, Journal_Article.ComponentID,
     Journal_Article.VersionID
FROM Journal_Article
WHERE contains(Text, "'The authors are thankful to'") = 1
```

This example shows how text search is done. Basically, the search functions defined by a text search engine, e.g. SQL UDFs in the DB2 Text Extender, can be directly used in the query.

EXAMPLE QUERY #5

Find all journal articles whose title starts with the pattern 'XML'. Order the result by the title of the containing Journal.

```
Example XML Query syntax: //Journal_Article[@Title LIKE "XML%"]
SORTBY( . . . /@Title)
SQL Query:
SELECT DISTINCT Journal_Article.ItemID, Journal_Article.ComponentID,
     Journal_Article.VersionID, Journal.Title
FROM Journal_Article, Journal
WHERE Journal_Article.Title LIKE 'XML%'
    AND Journal.ComponentID = Journal_Article.ParentCompID
ORDERBY Journal.Title
```

The example above shows how ordering can be done using XML query syntax.

The disclosed content management system has many advantages in terms of simplifying the user's task of writing queries. Viewing the CM system metadata as an XML document abstracts out the physical mapping of CM data model to relational database tables. It enables the user of existing XML Query Language (XQuery) to easily write queries against the CM metadata. It also eliminates the need of developing a new query notation. The Path Expressions in XQuery allow a high level expression of parent-child and ancestor-descendent relationships between components of an Item. It is also possible to write a single query for both data and metadata using the wild-card notation ('*') and the descendent axis notation ('//'). The dereference operator in XQuery allows easy expression of queries involving link relationship if a link is viewed as both—(i) an "Outbound_Link" element nested within the element representing the source of the link and (ii) an "Inbound_Link" element nested within the element representing the target of the link. In fact, viewing links this way eliminates the need to use XQuery FLWR expressions in query involving links—i.e. such a query can be expressed using just the Path Expression subset of XQuery.

The disclosed content management system can be stored on virtually any computer-readable storage media, such as CD, DVD and other magnetic and optical media in either compressed or non-compressed form. Of course, it can also be stored on a server computer system or other information handling system.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in a manner consistent with the scope of the embodiments disclosed herein.

What is claimed is:

1. A method of searching data including hierarchical metadata in a content management system, the content management system containing a plurality of items comprising hierarchical item metadata, and the content management system defining a tree-based hierarchical relationship between child components of the plurality of items, the method comprising:
   receiving a hierarchical query string in context of the tree-based hierarchical relationship; and
   translating the hierarchical query string into a relational database query string, the relational database query string defining interrelationships between associated relational database tables, wherein the step of translating the hierarchical query string comprises identifying a root of the hierarchical metadata, and extracting the interrelationships between the associated relational database tables based on the tree-based hierarchical relationship of the child components.

2. The method of claim 1, further comprising the step of executing a query against a relational database based on the translated relational database query string.

3. The method of claim 1, wherein defining the tree-based hierarchical relationship comprises providing an XML schema in which the child components are represented as nested XML elements.

4. The method of claim 1, wherein the hierarchical query string is represented in an XML Query (Xquery) format.

5. The method of claim 1, wherein the relational database query string is represented as Structured Query Language (SQL).

6. The method of claim 5, wherein the interrelationships between the associated relational database tables are represented by at least one SQL join in the relational database query string.

7. The method of claim 5, wherein the interrelationships between the associated relational database tables are represented by at least one SQL union in the relational database query string.

8. The method of claim 1, wherein the hierarchical metadata comprises at least one user-defined attribute of at least one item in the plurality of items.

9. The method of claim 1, wherein the hierarchical metadata comprises at least one inbound link.

10. The method of claim 1, wherein the hierarchical metadata comprises at least one outbound link.

11. The method of claim 1, wherein the hierarchical metadata comprises at least one reference to a particular item.

12. A computer-implemented content management system for searching hierarchical metadata, the computer-implemented content management system containing a plurality of items comprising hierarchical item metadata, and the computer-implemented content management system defining a tree-based hierarchical relationship between child components of the plurality of items, the computer-implemented content management system comprising:
   a query processor adapted to process a hierarchical query string in context of the tree-based hierarchical relationship; and
   a library server adapted to translate the hierarchical query string into a relational database query string, the relational database query string defining interrelationships between associated relational database tables, wherein translating the hierarchical query string comprises identifying a root of the hierarchical metadata and extracting the interrelationships between the associated relational database tables based on the tree-based hierarchical relationship of the child components of the plurality of items.

13. The computer-implemented content management system of claim 12 further comprising a relational database adapted to receive and process a query against a relational database based on the translated relational database query string.

14. The computer-implemented content management system of claim 12, wherein the query processor employs an XML schema in which the child components are represented as nested XML elements.

15. A computer program product comprising a combination of code segments stored in a computer-readable memory and executable by a processor in a cache server, the computer program product comprising:
   at least one code segment operable to receive a hierarchical query string for querying hierarchical metadata in a context of a tree-based hierarchical relationship in which a plurality of items comprise a plurality of child components; and
   at least one code segment operable to translate the hierarchical query string into a relational database query string, the relational database query string defining interrelationships between associated relational database tables, wherein the at least one code segment operable to translate the hierarchical query string into the relational database query string comprises at least one code segment operable to identify a root of the hierarchical metadata and to extract the interrelationships between the associated relational database tables based on the tree-based hierarchical relationship of the child components of the plurality of items.

16. The computer program product of claim 15, further comprising at least one code segment operable to execute a query against a relational database based on the translated relational database query string.

17. The computer program product of claim 15, wherein defining the tree-based hierarchical relationship comprises providing an XML schema in which the child components are represented as nested XML elements.

18. The computer program product of claim 15, wherein the hierarchical query string is represented in an XML Query (Xquery) format.

19. The computer program product of claim 15, wherein the relational database query string is represented as Structured Query Language (SQL).

20. The computer program product of claim 15, wherein the interrelationships between the associated relational database tables are represented by at least one SQL join in the relational database query string.

21. The computer program product of claim 15, wherein the hierarchical metadata comprises at least one user-defined attribute of at least one item in the plurality of items.

* * * * *